US00RE38121E

(19) United States
(12) Reissued Patent
Powell et al.

(10) Patent Number: US RE38,121 E
(45) Date of Reissued Patent: May 20, 2003

(54) SECURITY VENT

(75) Inventors: Robert A. Powell, Frankfort, KY (US); Richard W. Stephens, Columbia, KY (US)

(73) Assignee: Security Access, Inc., Lake Ariel, PA (US)

(21) Appl. No.: 09/449,686

(22) Filed: Nov. 24, 1999

Related U.S. Patent Documents

Reissue of:
(64) Patent No.: 5,976,007
Issued: Nov. 2, 1999
Appl. No.: 09/031,948
Filed: Feb. 27, 1998

(51) Int. Cl.[7] ..... F24F 13/28
(52) U.S. Cl. ..... 454/48; 55/506; 454/271
(58) Field of Search ..... 454/48, 254, 271, 454/273, 274; 109/1 V; 55/385.2, 501, 506

(56) References Cited

U.S. PATENT DOCUMENTS

| | | | | |
|---|---|---|---|---|
| 693,638 A | | 2/1902 | Breuer | |
| 1,677,421 A | | 7/1928 | Yager et al. | |
| 2,575,499 A | | 11/1951 | Manow | 55/506 X |
| 3,204,392 A | | 9/1965 | Schwab | |
| 3,301,168 A | | 1/1967 | Schindler et al. | |
| 3,740,934 A | | 6/1973 | Shuler | |
| 4,171,210 A | | 10/1979 | Miller | |
| 4,340,937 A | | 7/1982 | Volk, Jr. | |
| 4,365,541 A | | 12/1982 | Marques et al. | |
| 4,472,184 A | | 9/1984 | Neumann et al. | |
| 4,669,239 A | * | 6/1987 | Maggs | |
| 5,280,273 A | | 1/1994 | Goldstein | |
| 5,421,862 A | | 6/1995 | Davis | |
| 5,514,036 A | | 5/1996 | Lin | |
| 5,679,121 A | | 10/1997 | Kim | 55/506 X |

FOREIGN PATENT DOCUMENTS

| | | | |
|---|---|---|---|
| FR | 1.330.148 | 12/1962 | 454/271 |
| GB | 138782 | 2/1920 | 454/273 |
| GB | 506197 | 1/1930 | |
| GB | 2085195 | 3/1984 | |

OTHER PUBLICATIONS

Publication, "Trans–aire", Bud Radio, Inc., Cleveland 3, Ohio, 2 pages.

* cited by examiner

*Primary Examiner*—Harold Joyce
(74) *Attorney, Agent, or Firm*—Baker & Daniels

(57) ABSTRACT

A security vent, providing a housing assembly mounted to a support, the housing assembly including a side wall portion having first and second distal ends thereof and defining a passageway therebetween; a drawer assembly having a filter-receiving slot therein, the drawer assembly being slidingly received by the housing assembly second distal end, the drawer assembly being moveable within the housing assembly passageway between an open position and a closed position, wherein the filter-receiving slot is disposed within the housing assembly when the drawer assembly is in the closed position, and wherein the filter-receiving slot is in communication with a region outside the housing support when the drawer assembly is in the open position; and, a latch assembly mounted to the housing assembly, the latch assembly being moveable between a locked position and an unlocked position, the latch assembly being received by a latch-receiving notch provided in the drawer assembly when the drawer assembly is in the closed position and the latch assembly is in the locked position.

51 Claims, 9 Drawing Sheets

SECURITY VENT

Matter enclosed in heavy brackets [ ] appears in the original patent but forms no part of this reissue specification; matter printed in italics indicates the additions made by reissue.

BACKGROUND OF THE INVENTION

1. Technical Field of the Invention

The present invention relates to air vents for use in providing ventilation to and from an enclosed region within a building, such as, for example, a room, closet, office, restroom or the like. More particularly, the present invention relates to an air vent for use in providing ventilation to and from an enclosed region within a building, such as, for example, a room, closet, office, restroom or the like, wherein the air vent prevents access to an area exterior to the enclosed region therethrough.

2. Description of the Related Art

Office buildings, commercial establishments, industrial plants, educational institutions, residential homes and the like, typically include a plurality of enclosed regions, such as, for example, rooms, closets, offices, restrooms or the like, defined therein for occupancy by office personnel, customers, employees, students, residents or the like. The building and the enclosed regions each require ventilation and exchange of the air contained therein with the air exterior to the building existing in the surrounding ambient. Typically, return air, that is, air being removed from the enclosed regions and expelled from the building into the ambient, is pumped from within the enclosed regions and out of the building by a heating, ventilating and air-conditioning ("HVAC") system which typically comprises a series of large fans and a network of inter-connected air ducts connecting the respective enclosed regions of the building to the exterior of the building.

Filtering of the return air to remove, air-born particles, such as, for example, dust, debris, smoke and the like, is typically performed at the outlet end of the HVAC system just prior to expelling the exhaust air therefrom. Further, the return air is typically not filtered at the respective inlet ends of the return air ducts, which respectively communicate with the numerous enclosed regions. Because the return air is not filtered prior to entry thereof into the return air duct network, air-born material is permitted to accumulate within the air duct network at various locations throughout, thereby increasing the risk of a so-called "duct fires" therein, as well as decreasing the overall operating efficiency of the HVAC system. It is therefore desirable to provide an air vent for use with an HVAC system of a building. It is also desirable to provide an air vent for use with an HVAC system of a building, wherein the air vent removably receives a filter therein for use in removing airborn particles therefrom. It is furthermore desirable to provide an air vent for use with an HVAC system of a building, wherein the air vent removably receives a filter therein for use in removing air-born particles therefrom, and wherein the air vent is provided at an inlet end of a return air duct.

Similarly, penal institutions, mental hospitals and other secure facilities require ventilation and exchange of the air contained therein, and of the air contained within the cells, rooms and other confined areas therein, with the air exterior thereto existing in the surrounding ambient. However, unlike a non-secure facility, a secure facility must not present an opportunity for a confined individual to escape therefrom, such as, for example, through the HVAC system, or present an opportunity for the confined individual to insert an article of contraband therein, such as, for example, a weapon, drug paraphernalia or the like. Thus, the respective inlet ends of the return air ducts are oftentimes integrally formed with the wall portions which define the respective enclosed regions. A removable air vent is not typically provided at the inlets ends of the return air ducts connected to the wall portions of a secure facility, as this may present an opportunity for a confined individual to remove same and escape from the secure facility or to insert contraband therein. Rather, the wall portion is typically provided with a security screen having a plurality of apertures therethrough through which air from the enclosed region may pass into the return air duct network.

Access to the return air ducts from the enclosed region is prevented by the security screens, which, as stated, are integrally-formed with the respective wall portions defining the enclosed regions. Thus, a filter cannot be positioned inwardly adjacent the security screen to remove air-born material from the return air prior to entry into the return air duct network, as maintenance personnel would not be able to remove and/or clean same from accumulated air-born material, dirt or debris.

It has been further observed that air-born material instead accumulates on the security screens, which are neither accessible nor replaceable, thereby decreasing volumetric flow of air from the enclosed regions into the return air duct, decreasing overall ventilation efficiency, decreasing the quality of air being removed from the enclosed regions, and increasing the likelihood of so-called "duct fires" due to ignition of the accumulated air-born material. It is therefore desirable to provide an air vent for use with an HVAC system of a building, wherein the air vent provides secure access to an air duct connected thereto.

There are no air vents known to Applicants whereby attachment of the air vent to an air duct provides secure access thereto, and wherein a filter is removably received thereby.

SUMMARY OF THE INVENTION

The present invention is for a security vent for use in a secure facility, such as, for example, a penal institution, a mental hospital or the like, or for use in a non-secure facility, such as, for example, an office building, commercial establishment, industrial plant, educational institution, residential home or the like. More particularly, a security vent according to a preferred embodiment of the present invention includes a housing assembly having an open first end fixedly secured to an inlet end of a return air duct and an open second end fixedly secured to a wall portion of an enclosed region of the secure facility, such as, for example, an inmate cell, and defining an opening through the wall portion by which air may be conveyed from the enclosed region, through the housing assembly and into the return air duct. A drawer assembly is slidingly received by the second end of the housing assembly between a closed position and an open position, wherein the drawer assembly is securable to the housing assembly by a latch assembly when the drawer assembly is in the closed position, and wherein a filter tray is exposed when the drawer assembly is in the open position. Removal of the drawer assembly from within the housing assembly is prevented by first and second stops provided on an inner surface of the housing assembly. A filter is removably received by the filter tray when the drawer assembly is in the open position and is slidingly received within the housing assembly when the drawer assembly is in the closed position. The latch assembly is mounted within the housing assembly to prevent unauthorized opening of the drawer assembly and requires a latch key designed specifically therefor to unlock.

It is an object of the present invention to provide an air vent for use with an HVAC system of a building.

It is another object of the present invention to provide an air vent for use with an HVAC system of a building, wherein the air vent removably receives a filter therein for use in removing air-born particles therefrom.

It is yet another object of the present invention to provide an air vent for use with an HVAC system of a building, wherein the air vent removably receives a filter therein for use in removing air-born particles therefrom, and wherein the air vent is provided at an inlet end of a return air duct.

It is still another object of the present invention to provide an air vent for use with an HVAC system of a building, wherein the air vent provides secure access to an air duct connected thereto.

A security vent according to a preferred embodiment of the present invention includes a housing assembly mounted to a support, the housing assembly including a side wall portion having first and second distal ends thereof and defining a passageway therebetween; a drawer assembly having a filter-receiving slot therein, the drawer assembly being slidingly received by the housing assembly second distal end, the drawer assembly being moveable within the housing assembly passageway between an open position and a closed position, wherein the filter-receiving slot is disposed within the housing assembly when the drawer assembly is in the closed position, and wherein the filter-receiving slot is in communication with a region outside the housing support when the drawer assembly is in the open position; and, a latch assembly mounted to the housing assembly, the latch assembly being moveable between a locked position and an unlocked position, the latch assembly being received by a latch-receiving notch provided in the drawer assembly when the drawer assembly is in the closed position and the latch assembly is in the locked position.

BRIEF DESCRIPTION OF THE DRAWINGS

A better understanding of the present invention will be had upon reference to the following description in conjunction with the accompanying drawings in which like numerals refer to like parts, and wherein.

DETAILED DESCRIPTION OF THE PREFERRED EMBODIMENTS

Figure 1:
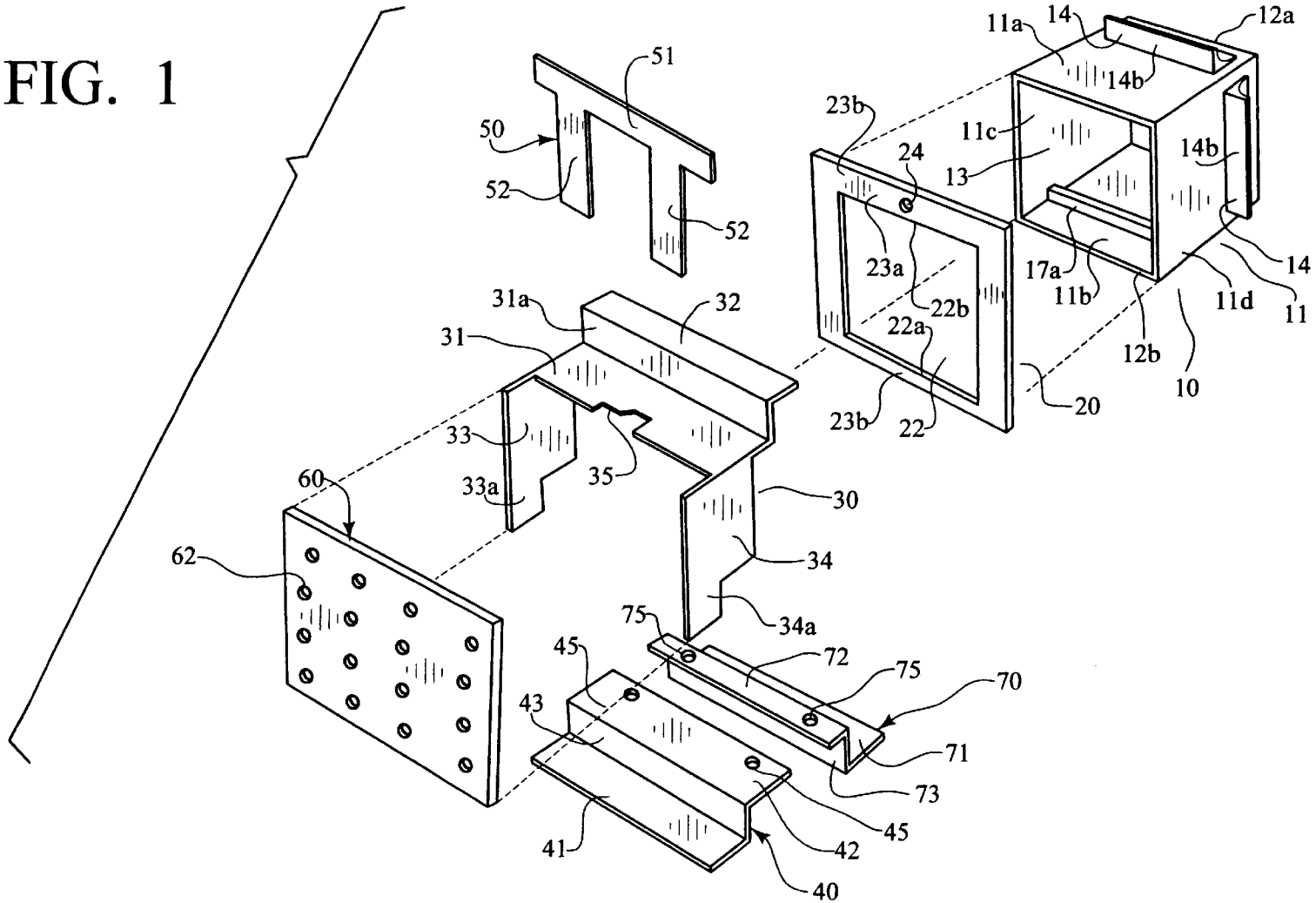
FIG. 1 is an exploded perspective view of a security vent according to a preferred embodiment of the present invention.

With reference to FIG. 1, a security vent 5 according to a preferred embodiment of the present invention includes an outer housing 10, a housing face 20, a drawer top 30, a drawer bottom 40, a filter stop 50, a drawer face 60 and a removable clip 70, each of which is preferably constructed from malleable hot-rolled steel which is sized, shaped and oriented as described hereinbelow. However, any suitable material being respectively formable into a similar size, shape and orientation thereof may be substituted in place thereof without departing from either the spirit or the scope of the present invention.

Figure 2:
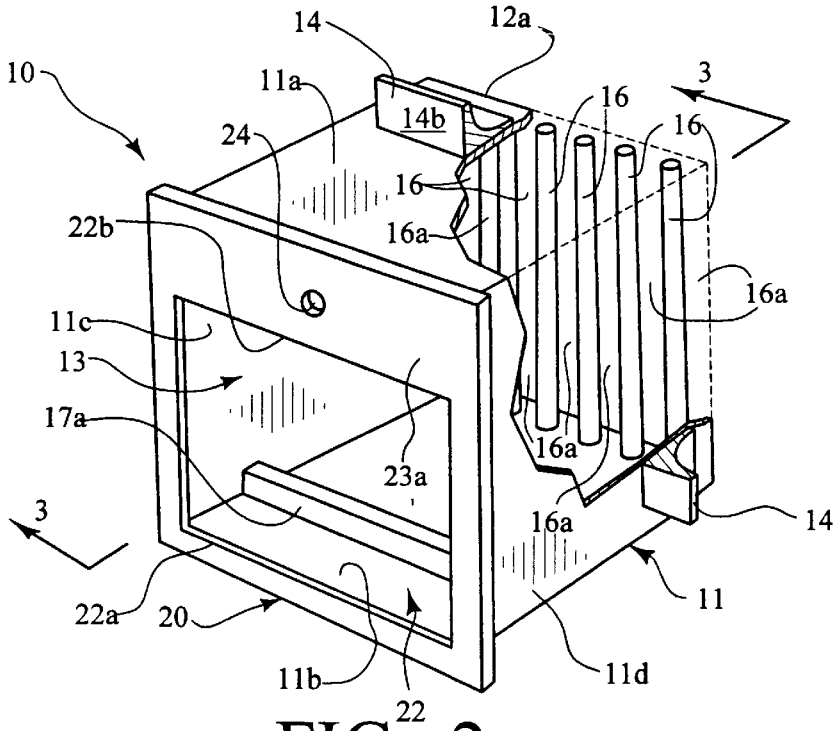
FIG. 2 is a perspective cut-away view of an outer housing of the security vent of FIG. 1.
Figure 3:
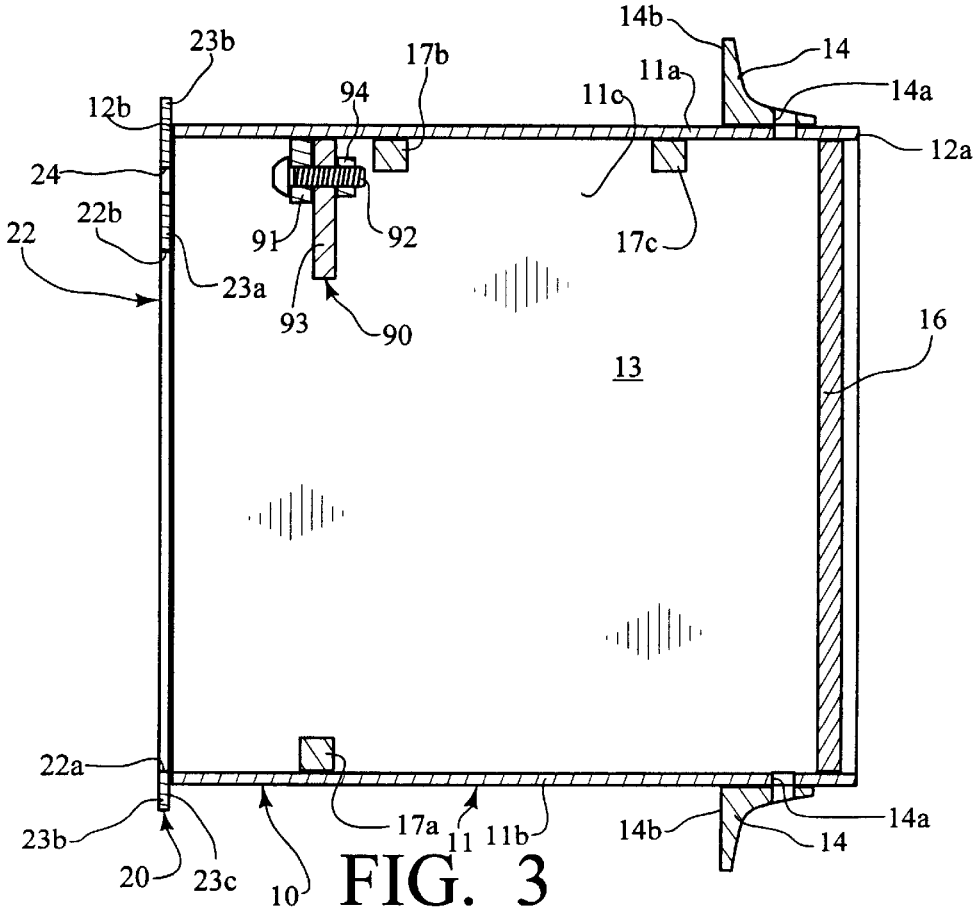
FIG. 3 is a section view of the outer housing of FIG. 2, shown along section line 3—3 of FIG. 2.

With additional reference to FIGS. 2 and 3, the outer housing 10 includes a substantially box-shaped side wall 11 having first and second open distal ends 12a, 12b, respectively, defining a passageway 13 therebetween. The side wall 11 includes first and second horizontal wall portions 11a, 11b, respectively, being in spaced parallel relation to one another, and first and second vertical wall portions 11c, 11d, respectively, being in spaced parallel relation to one another. Respective first and second longitudinal side edges of the horizontal wall portions 11a, 11b are integrally-formed with, or otherwise fixedly secured to, such as, for example, by welding, to upper and lower longitudinal edges of the vertical wall portions 11c, 11d, thereby forming the preferred box-shaped construction of the outer housing 10. The side wall 11 is sized and shaped to permit sliding engagement of an inlet end (FIG. 10) of a return air duct 8 (FIG. 10) therein, wherein the first distal end 12a of the outer housing 10 is fixedly secured, such as, for example, by welding, to the inlet end of the return air duct 8.

A plurality of rods 16 are integrally-formed with, or are otherwise fixedly secured, such as, for example, by welding, to respective opposing inner surfaces of the first and second horizontal wall portions 11a, 11b at distal ends thereof near the first distal end 12a of the outer housing 10. The plurality of rods 16 are in equidistantly-spaced relation to one another across the passageway 13 between the first and second vertical wall portions 11c, 11d to define a plurality of open spaces 16a therebetween being sized approximately 4 to 6 inches in width. Each of the plurality of open spaces 16a is sized to prevent passage therethrough by an individual of small proportions.

A lower stop 17a is integrally-formed with, or is otherwise fixedly secured, such as, for example, by welding, to an inner surface of the second horizontal wall portion 11b and extends between opposing inner surfaces of the first and second vertical wall portions 11c, 11d near the second distal end 12b of the outer housing 10. A first upper stop 17b is integrally-formed with, or is otherwise fixedly secured, such as, for example, by welding, to an inner surface of the first horizontal wall portion 11a and extends between the opposing inner surfaces of the first and second vertical wall portions 11c, 11d near the second distal end 12b of the outer housing 10. A second upper stop 17c is integrally-formed with, or is otherwise fixedly secured, such as, for example, by welding, to the inner surface of the first horizontal wall portion 11a and extends between the opposing inner surfaces of the first and second vertical wall portions 11c, 11d between the first upper stop 17b and the second distal end 12b of the outer housing 10.

Figure 4:
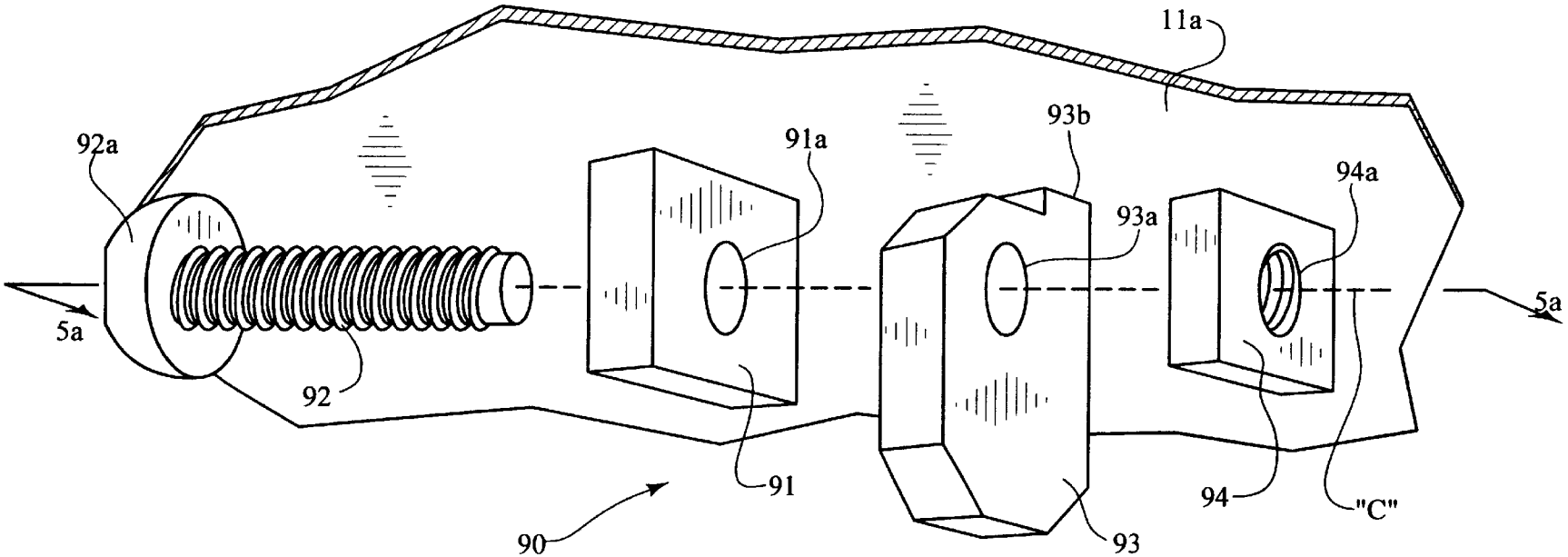
FIG. 4 is an exploded perspective view of a latch assembly of the security vent of FIG. 1.
Figure 5B:
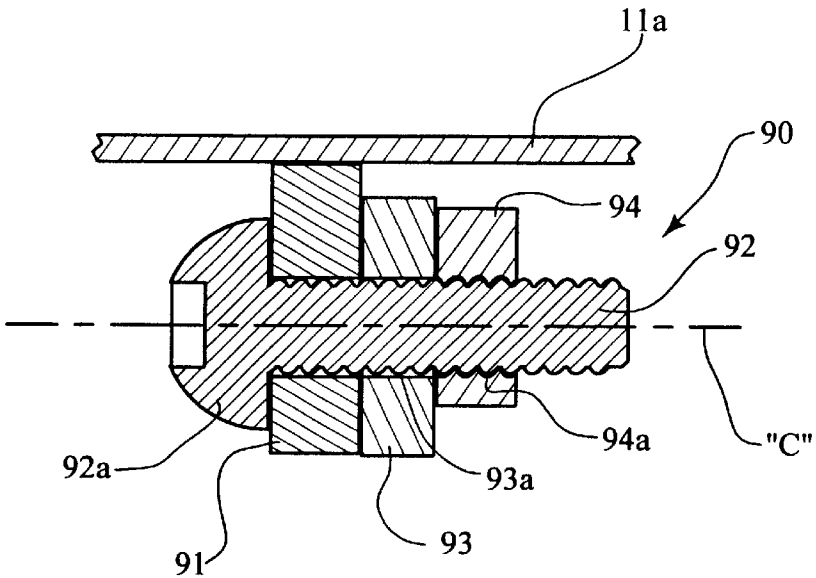
FIG. 5b is a section view of the latch assembly of FIG. 4, shown assembled along section line 5a—5a of FIG. 4, wherein a latch is shown in an "unlocked" position.

With additional reference to FIGS. 4–5b, a latch assembly 90 is mounted to the inner surface of the first horizontal wall portion 11a between the first upper stop 17b and the second distal end 12b of the outer housing 10. The latch assembly 90 includes a mount block 91 fixedly secured, such as, for example, by welding, to the inner surface of the first horizontal wall portion 11a, a tightening bolt 92 being slidingly received by a mount block throughbore 91a, a latch 93 having a bore 93a therethrough to slidingly receive the tightening bolt 92 and a lock block 94 threadingly engaging the tightening bolt 92 through a threaded hole 94a therethrough. The threads of the lock block 94 and of the tightening bolt 92 are designed such that relative rotation therebetween requires a large torque. As such, the tightening bolt 93 could not be threadingly removed from the lock block 94 by hand-rotation thereof. The latch 93 and the lock block 94 are fixedly secured, such as, for example, by welding, to one another to prevent relative rotation therebetween.

Figure 5A:
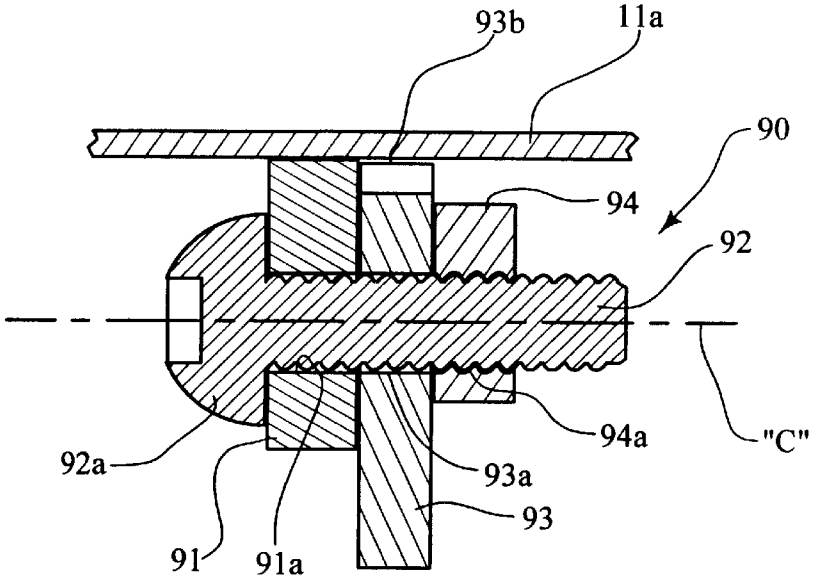
FIG. 5a is a section view of the latch assembly of FIG. 4, shown assembled along section line 5a—5a of FIG. 4, wherein a latch is shown in a "locked" position.

More particularly, the tightening bolt 92 is threadingly engaged with the threaded hole 94a of the lock block 94, so that the latch 93 is positioned between the lock block 94 and the mount block 91. The latch 93 is positioned in a "locked" position, as generally shown in FIG. 5a, such that an upper step 93b of the latch 93 abuts the underside surface of the first horizontal wall portion 11a, thereby preventing rotation of the latch 92, and of the lock block 94 fixedly secured thereto, when the tightening bolt 92 is rotated in a clockwise direction. Rotation of the tightening bolt 92 to further engage the lock block 94 causes the latch 93 to move translationally along the axis "C" until the latch 93 abuts and is tightly secured to the mount block 91. Further rotation of the tightening bolt 92 frictionally secures the latch 93 to the mount block 91, pinching the latch 93 between the mount block 91 and the lock block 94, thereby requiring a large torque to unthread the tightening bolt 92 therefrom.

Rotation of the tightening bolt 92 in a counter-clockwise direction, such as to unthread the tightening bolt 92 from within the lock block 94, causes the lock block 94, and the latch 93 fixedly secured thereto, to rotate in a counter-clockwise direction, and into an "unlocked" position, as is generally shown in FIG. 5b.

With reference back to FIGS. 1–3, the housing face 20 is shaped substantially like a picture frame and is fixedly secured, such as, for example, by welding, to the second distal end 12b of the outer housing 10. The housing face 20 includes an opening 22 therethrough having a perimeter being substantially coextensive with a perimeter of the passageway 13. More particularly, the opening 22 includes a lower transverse edge 22a which is flush with the inner surface of the second horizontal side wall portion 11b and an upper transverse edge 22b spaced between the first transverse edge 22a and the first horizontal side wall portion 11a, defining a downward lip portion 23a therebetween. A key hole 24 is provided through the downward lip 23a substantially centered between the first and second vertical side wall portions 11c, 11d and positioned between the upper transverse edge 22b of the opening 22 and the first horizontal side wall portion 11a such that the key hole 24 is aligned with the latch assembly 90 along the axis "C". The housing face 20 includes an outer perimeter being larger than an outer perimeter of the outer housing 10, thereby defining a retaining ridge 23b projecting outwardly from the outer housing outer perimeter therearound.

At least one flange 14, such as, for example, an "L"-shaped angle beam segment, is fixedly secured, such as, for example, by bolting, to at least one of the side wall portions 11a, 11b, 11c, 11d, near the first distal end 12a of the outer housing 10 a preselected distance therefrom towards the second distal end 12b of the outer housing 10. Preferably, one flange 14 is fixedly secured to each of the side wall portions 11a, 11b, 11c, 11d. Further, each flange 14, and its corresponding side wall portion 11a, 11b, 11c, 11d, includes at least one hole 14a therethrough for receiving a bolt (not shown) therethrough to secure the flange 14 to the side wall 11. Alternatively, the flange 14 may be welded directly to an outer surface of the wall portion 11a, 11b, 11c, 11d as hereinbelow described, wherein the holes 14a are not provided.

An upright portion of the flange 14 defines a forwardly-facing surface 14b thereof which is in spaced relation to a rearwardly-facing surface 23c of the retaining ridge 23b by a preselected distance. The upright portion of the flange 14 cooperates with the retaining ridge 23b to sandwich a portion of a wall 6 (FIG. 10) therebetween, such as, for example, a wall 6 defining an enclosed space of a building, and to mount the security vent 5 thereto as hereinbelow described.

Figure 6:
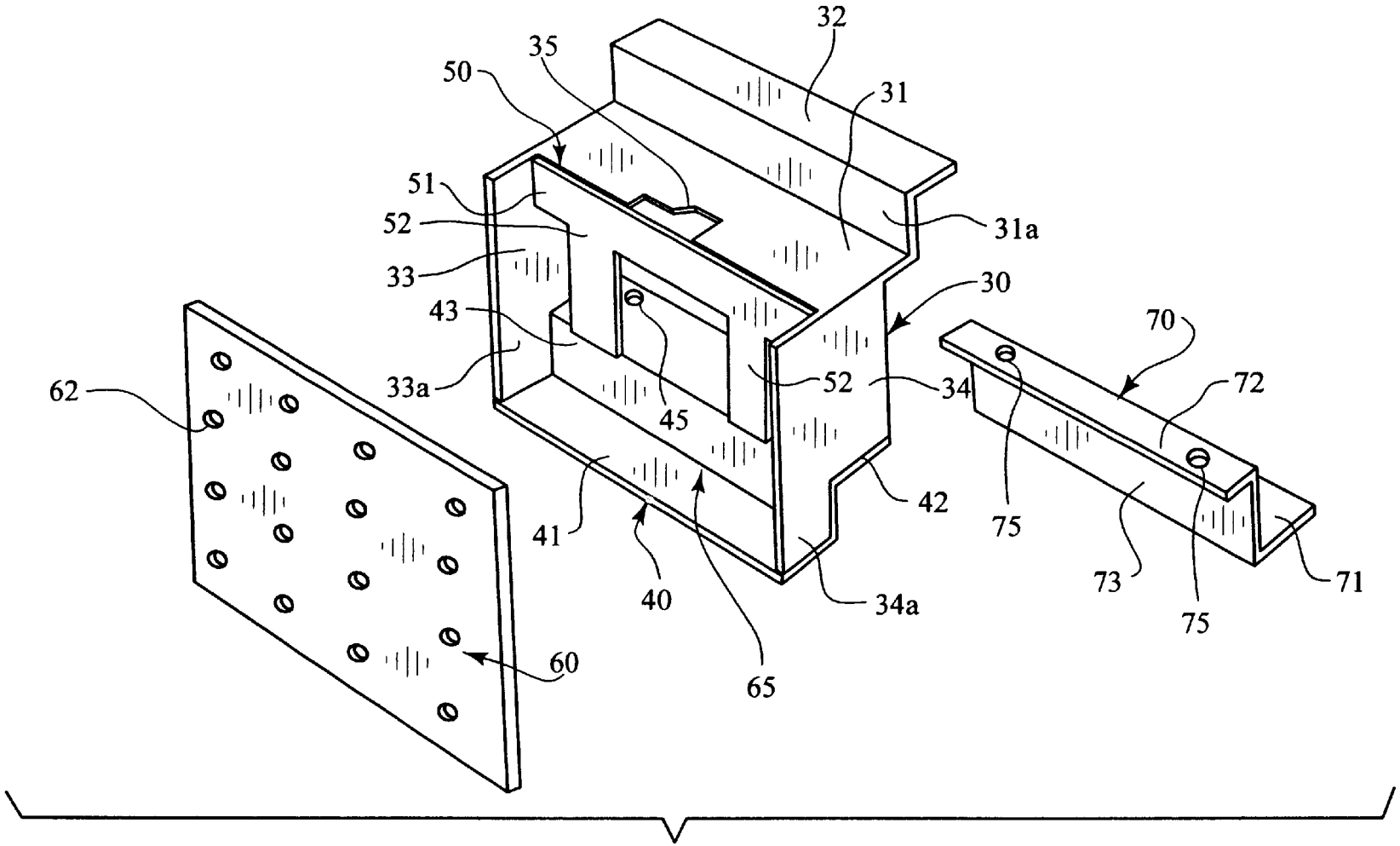
FIG. 6 is an exploded perspective view of a drawer assembly of the security vent of FIG. 1, showing the drawer prior to installation of a perforated face plate thereto.
Figure 7:
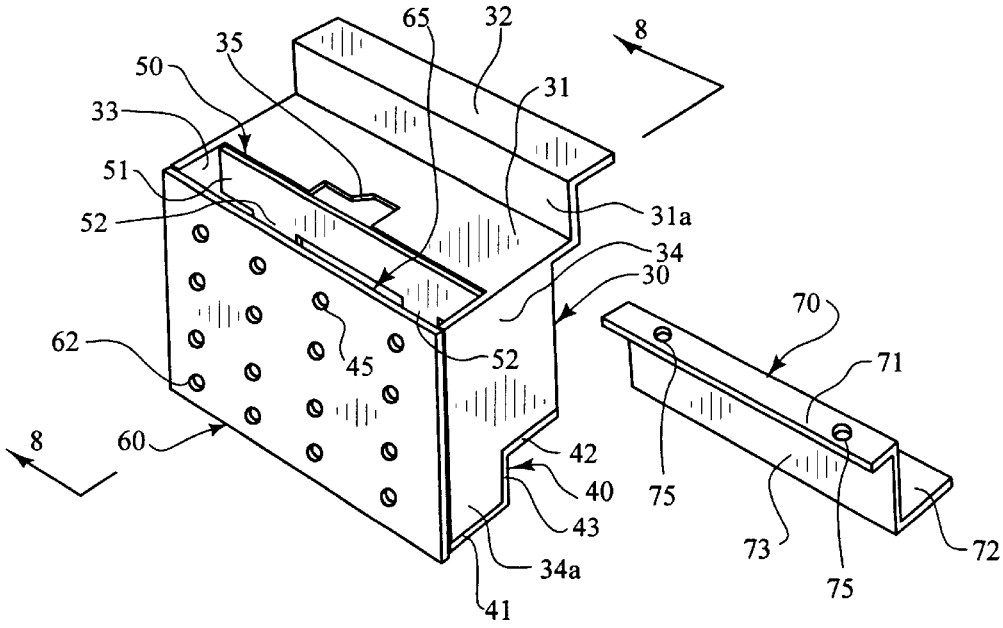
FIG. 7 is another exploded perspective view of a drawer assembly of the security vent of FIG. 1, showing the perforated face plate being installed on the drawer.
Figure 8:
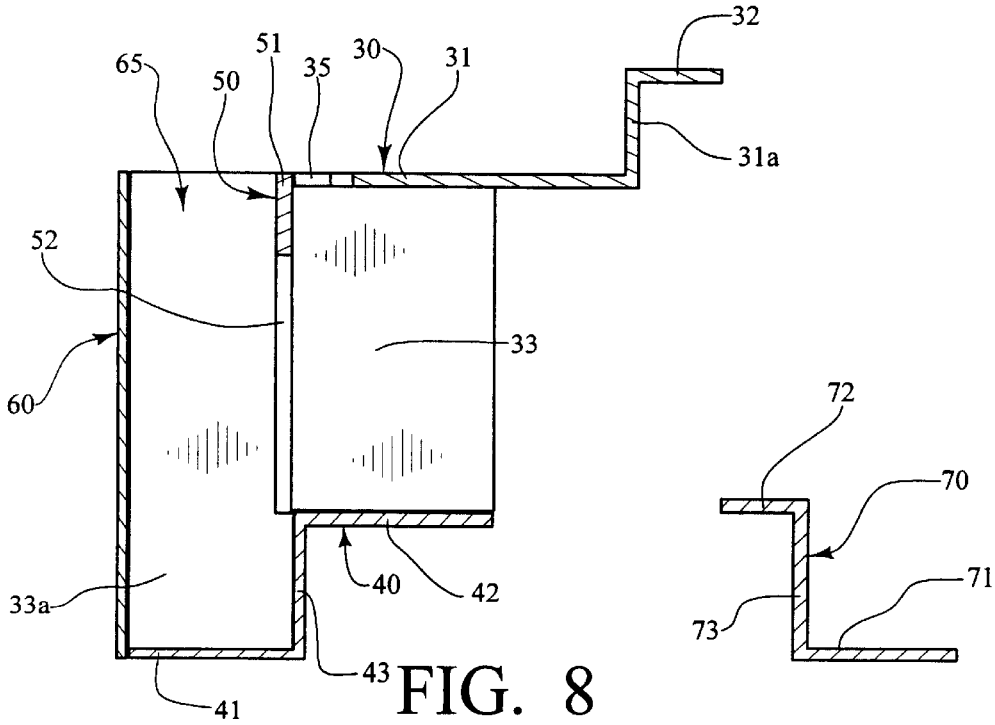
FIG. 8 is a section view of the drawer assembly of FIG. 7, shown along section line 8—8 of FIG. 7.

With reference to FIG. 1 and to FIGS. 6–8, the drawer top 30 includes a horizontal portion 31 having a upwardly-stepped portion 32 connected to a rearward edge of the horizontal portion 31 by a shoulder 31a, and a pair of arms 33, 34 projecting forwardly and downwardly from respective first and second side edges thereof. Each arm 33, 34 includes a projection 33a, 34a, respectively, depending downwardly therefrom a preselected distance. The horizontal portion 31 includes a stepped notch 35 cut out from a forward edge thereof centered between the first and second arms 33, 34, and sized to receive the latch 93.

The drawer bottom 40 includes a horizontal lower portion 41, and a horizontal upper portion 42 connected to the lower portion by a vertical shoulder 43. The drawer bottom 40 is fixedly secured, such as, for example, by welding, to each of the drawer top arms 33, 34 such that an upper surface of the horizontal lower portion 41 abuts and is secured to lower edges of each of the arm projections 33a, 34a, respectively. Further, a forwardly-facing surface of the vertical shoulder portion 43 abuts and is secured to rearward edges of each of the arm projections 33a, 34a, respectively. An upper surface of the horizontal upper portion 42 abuts and is secured to the lower edges of each of the arms 33, 34. At least one hole 45, and preferably two holes 45, are provided through the horizontal upper portion 42 towards a rearward edge thereof.

The filter stop 50 includes a longitudinal cross-member 51 fixedly secured, such as, for example, by welding, at longitudinal distal ends thereof to opposing inwardly-facing surfaces of the arms 33, 34 towards the drawer top horizontal portion 31. At least one downward member 52 is integrally-formed with and depends downwardly from the cross-member 51 and is fixedly secured, such as, for example, by welding, to the drawer bottom 40 near the intersection of the horizontal upper portion 42 and the vertical shoulder portion 43.

The drawer face 60 includes a plurality of orifices 62 therethrough and is fixedly secured, such as, for example, by welding, to respective forward edges of the drawer top arms 33, 34, arm projections 33a, 34a, and drawer bottom horizontal lower portion 41 around an outer perimeter thereof. The drawer face 60 is in spaced relation to the filter stop 50 and cooperates to define a filter-receiving slot 65 therebetween, having a perforated front defined by the drawer face 60, closed sides defined by the arms 33, 34, a closed bottom defined by the drawer bottom horizontal lower portion 41, a substantially open rear defined by the filter stop 50, and an open top sized to receive a filter 80 (FIG. 9) therein. The filter 80 is preferably constructed from fiberglass or the like. The drawer face 60 is sized and shaped substantially similar to the size and shape of the perimeter of the housing face opening 22.

The removable clip 70 includes a lower portion 71 and an upper portion 72 connected to the lower portion 71 by a shoulder 72. The horizontal upper portion 72 includes at least one hole 75, and preferably two holes 75, therethrough towards a forward edge thereof. The portions 71, 72, 73 of the removable clip 70 are respectively sized to permit the removable clip upper portion 72 to be slidingly received forwardly between the drawer top arms 33, 34, wherein a lower surface of the removable clip upper portion 72 is slidingly received over an upper surface of the drawer bottom horizontal upper portion 42 such that the drawer bottom holes 45 are aligned with the removable clip holes 75 when a forward face of the removable clip shoulder portion 73 abuts a rearward edge of the drawer bottom horizontal upper portion 42. The removable clip 70 is removably secured, such as, for example, by bolting, to the drawer bottom 40, by a bolt 2 passing through the holes, 45, 75 and threadingly secured to a nut 3. The removable clip portions 71, 72, 73 are further disposed such that a lower surface of the removable clip lower portion 71 is substantially coplanar with a lower surface of the drawer bottom horizontal lower portion 41 when the removable clip 70 is removably secured to the drawer bottom 40 as hereinabove described.

With respect to FIGS. 9 and 10, the stops 17a, 17b, 17c, the latch assembly 90 and the housing face 20 are assembled as hereinabove described and cooperate to define a welded housing assembly. An opening 7 is provided in a wall 6 defining an enclosed region within a building, such as, for example, an inmate cell within a penal institution. The opening 7 is provided adjacent to an inlet end of a return air duct 8, which is disposed behind the wall 6, and is connected to a heating, ventilating and air-conditioning system to remove air from the enclosed region thereby. The opening 7 is sized and shaped to receive the first distal end 12a of the outer housing 10 therethrough, and to slidingly receive the outer housing 10 therethrough such that the rearwardly-facing surface 23c of the retaining ridge 23 abuts a room-side surface 6a of the wall 6. The at least one flange 14 is mounted to the outer housing 10 as hereinabove described, such as, for example, by welding or bolting, such that the forwardly-facing surface 14b of the flange upright portion abuts a back-side surface 6b of the wall 6, sandwiching the wall 6 between the at least one flange 14 and the retaining ridge 23b of the housing face 20. The inlet end of the return air duct 8 is received by the first distal end 12a of the outer housing 10 and welded, bolted or otherwise secured thereto.

The drawer top 30, the drawer bottom 40, the filter stop 50 and the drawer face 60 are assembled as hereinabove described and cooperate to define a welded drawer assembly which is received by the housing assembly through the opening 22 of the housing face 20 and into the housing passageway 13. More particularly, the upwardly-stepped portion 32 of the drawer top 31 is inserted into the opening 22 and the drawer assembly is positioned into a substantially horizontal orientation such that an upper surface of the stepped portion 32 abuts, and is in sliding relation to, the inner surface of the first horizontal wall portion 11a between the second and third stops 17b, 17c, respectively.

The removable clip 70 is attached to the drawer bottom 40 as hereinabove described such that a lower surface of the lower portion 71 of the removable clip 70 abuts, and is in sliding relation to, the inner surface of the second horizontal wall portion 11b of the outer housing 10 between the first stop 17a and the first distal end 12a of the housing portion 10. Alternatively, the removable clip 70 may be attached to the drawer bottom 40 prior to mounting the housing assembly to the wall 6.

Figure 9:
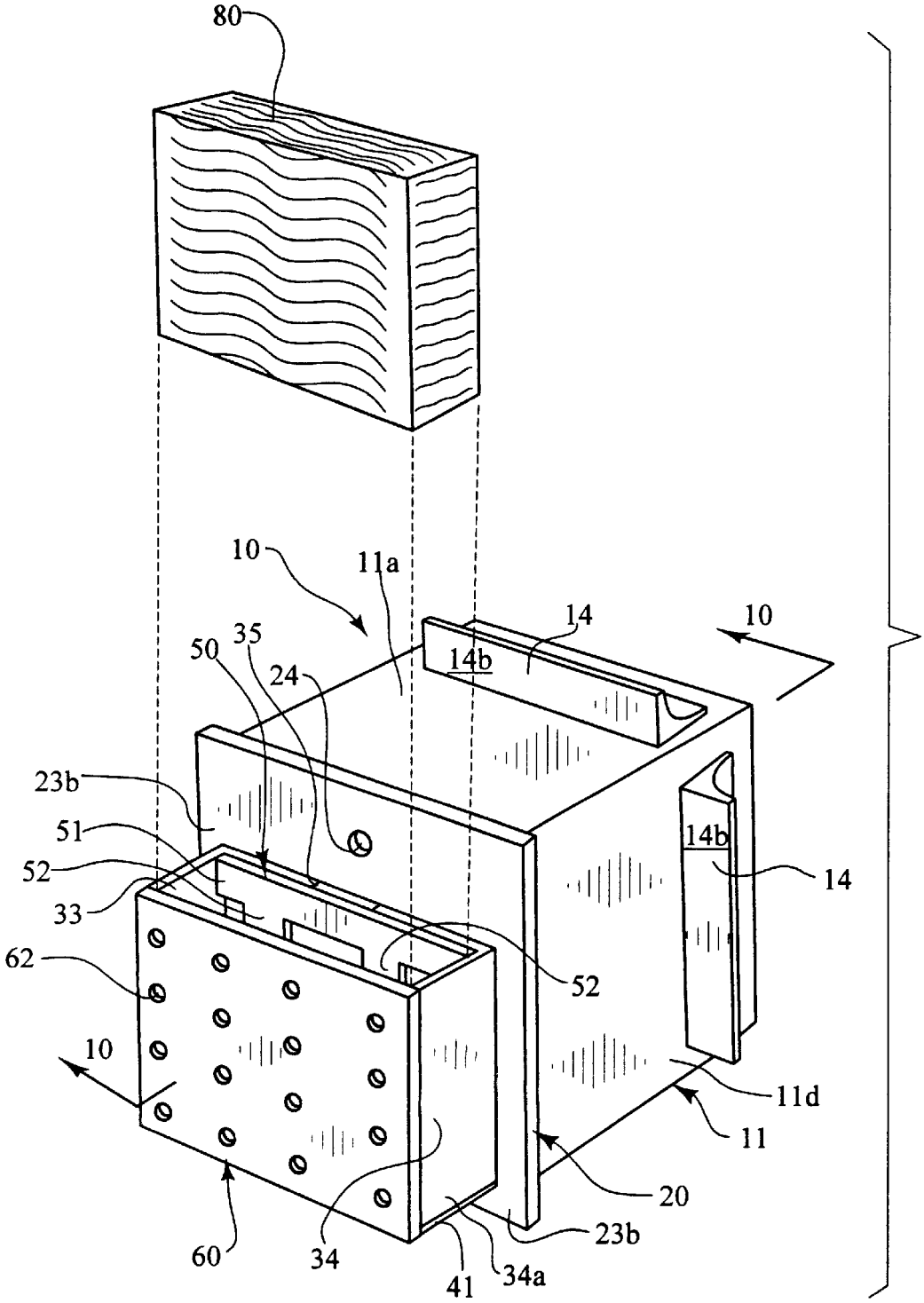
FIG. 9 is a perspective view of the security vent of FIG. 1, shown assembled, wherein the drawer is shown in an "open" position, and wherein a filter is shown in spaced relation thereto.
Figure 10:
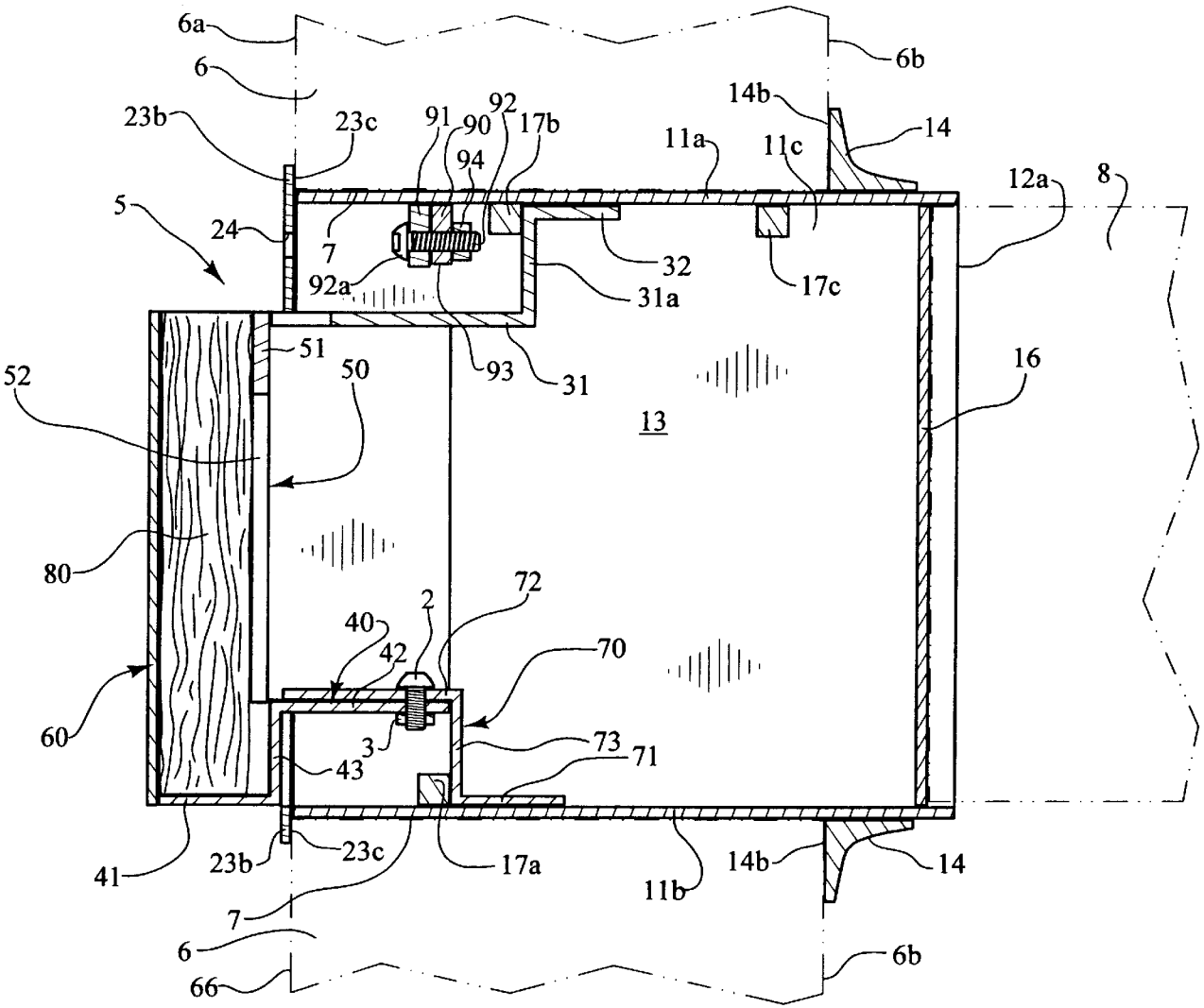
FIG. 10 is a section view of the security vent of FIG. 9, shown assembled along section line 10—10 of FIG. 9, wherein the drawer is shown in an "open" position, wherein the filter is shown inserted into the drawer, and wherein portions of a wall and portions of an air duct are shown in phantom attached to the security vent.

The stops 17a, 17b, the drawer top 30, the drawer bottom 40 and the removable clip 70 are each sized and positioned such that the forward face of the removable clip shoulder 73 and a forward face of the shoulder portion 31a of the drawer top 30 abut the stops 17a, 17b, respectively, when the drawer assembly is in an "open" position, as shown in FIGS. 9 and 10, thereby preventing forward sliding movement of the drawer assembly within the housing assembly beyond the stops 17a, 17b. The drawer assembly cannot be removed from the housing assembly without first removing the removable clip 70 therefrom. Further, because the forward travel of the drawer assembly is limited to the "open" position, wherein only enough of the drawer assembly is exposed to permit an individual to insert the filter 80 downwardly into the filter-receiving slot 65, removal of the removable clip 70 is very difficult from the front of the security vent 5, through the housing opening 22, thereby rendering access to the passageway (and to the air duct 8 connected thereto) by an individual of small proportions very difficult. Accordingly, even if an individual successfully unlocks the security vent 5 and moves the drawer assembly into the "open" position, escape from the enclosed region therethrough is prevented. Further, rods 16 prevent escape by an individual through the security vent 5.

Once the removable clip 70 has been attached to the drawer assembly as hereinabove described, the filter 80 is inserted downwardly into the filter-receiving slot 65, and the drawer assembly is slidingly moved rearwardly within the housing assembly until the drawer face 60 is flush with the housing face 20, at which point, the third stop 17c abuts the rearward edge of the drawer top upwardly-stepped portion 32 and prevents further rearwardly travel of the drawer assembly within the passageway 13 of the outer housing 10.

Figure 11:
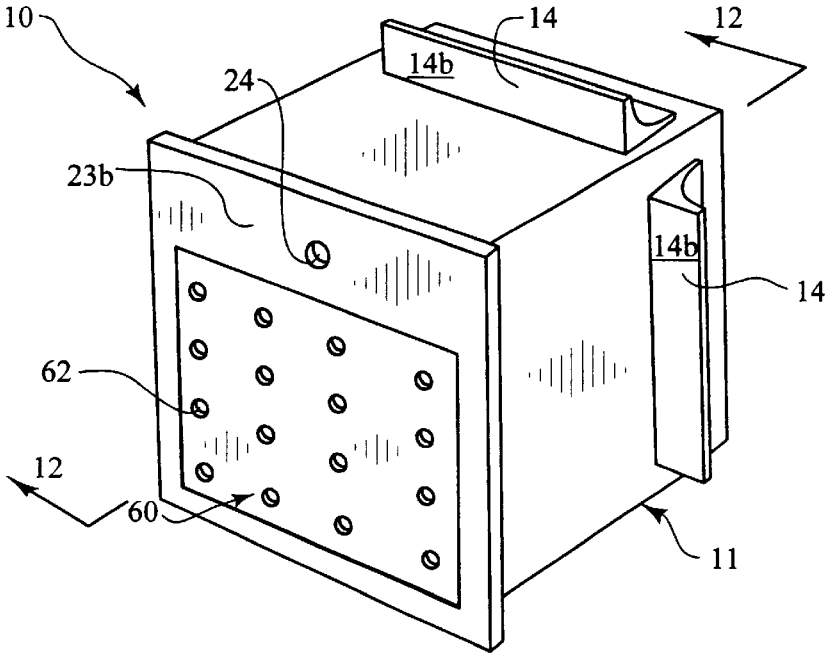
FIG. 11 is a perspective view of the security vent of FIG. 1, shown assembled, wherein the drawer is shown in a "closed" position; and, FIG. 12 is a section view of the security vent of FIG. 11, shown assembled along section line 12—12 of FIG. 11, wherein the drawer is shown in a "closed" position, and wherein a filter is shown inserted into the drawer.
Figure 12:
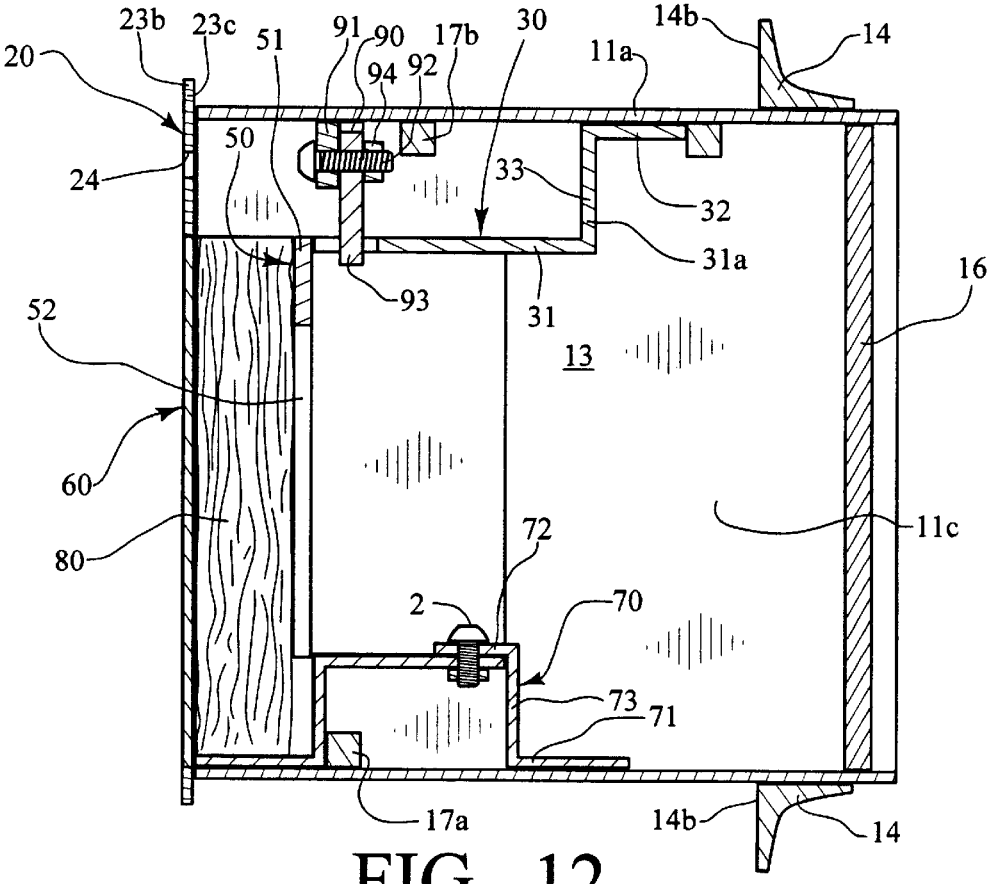

With respect to FIGS. 11 and 12, the drawer assembly is slidingly received within the passageway 13 of the housing assembly, and the latch 93 is manipulated into the "locked" position to extend downwardly into the stepped notch 35, thereby preventing either forwardly or rearwardly travel of the drawer assembly within the passageway 13 of the housing assembly. The frictional fit between the latch 93 and the mount block 91 prevents counter-clockwise rotation of the latch 93 without applying a large torque thereto. Because the drawer face 60 is flush with the housing face 20, an individual is unable to pull the drawer assembly forwardly from within the passageway 13 of the housing assembly without first manipulating the latch 93 into the "unlocked"

position out of the stepped notch 35. The filter stop 50, the filter 80 and the drawer face orifices 62 permit air to flow therethrough from the air duct 8 (FIG. 10) with only nominal static pressure being developed within the air duct 8 behind the filter 80.

A head portion 92a of the tightening screw 92 is provided with a hexagonal or other similarly shaped recess, which requires a key having a similar size, shape and geometry to rotate same. Accordingly, unwanted rotation of the latch 93 into the "unlocked" position out of the stepped notch 35, without the key, is prevented thereby.

Although the present invention has been described in terms of specific embodiments set forth in detail, it should be understood that this is by illustration only and that the present invention is not limited thereto, since alternative embodiments not described herein will become apparent to those skilled in the art in view of the disclosure. Accordingly, modifications are contemplated which can be made without departing from either the spirit or the scope of the present invention as described herein.

We claim:

1. A security vent, comprising:

a housing assembly mounted to a support, said housing assembly including a side wall portion having first and second distal ends thereof and defining a passageway therebetween;

a drawer assembly having a filter-receiving slot therein, said drawer assembly being slidingly received by said housing assembly second distal end, said drawer assembly being moveable within said housing assembly passageway between an open position and a closed position, wherein said filter-receiving slot is disposed within said housing assembly when said drawer assembly is in said closed position, and wherein said filter-receiving slot is in communication with a region outside said housing assembly when said drawer assembly is in said open position; and, a latch assembly mounted to said housing assembly, said latch assembly being moveable between a locked position and an unlocked position, said latch assembly being received by a latch-receiving notch provided in said drawer assembly when said drawer assembly is in said closed position and said latch assembly is in said locked position.

2. The security vent of claim 1, said housing assembly including:

a housing face attached to said second distal end of said side wall portion, said housing face having an opening therethrough sized to receive said drawer assembly, said opening communicating with said passageway, said housing face projecting outwardly from said side wall portion, thereby defining a retaining ridge; and, a key hole provided through said housing face, said key hole being coaxial with said latch assembly.

3. The security vent of claim 2, said housing assembly including:

at least one flange attached to an outer surface of said side wall portion near said first distal end thereof, said at least one flange cooperating with said retaining ridge to mount said housing assembly to said support.

4. The security vent of claim 1, said housing assembly including:

at least one longitudinal rod extending transversely across said passageway near said first distal end of said side wall, said at least one longitudinal rod being attached at either distal end thereof to an inner surface of said side wall portion.

5. The security vent of claim 1, said drawer assembly including:

a drawer top having a horizontal portion with an upwardly-stepped portion connected to a rear edge of said horizontal portion by a shoulder, said shoulder cooperating with a first stop provided on an inner surface of said housing assembly side wall portion to prevent said drawer assembly from forward movement beyond a preselected first position;

first and second arms depending downwardly from said horizontal portion, said first and second arms being in parallel spaced relation to one another;

a drawer bottom having a lower portion and a stepped portion connected to the lower portion by a vertical portion, said drawer bottom being attached to lower edges of said first and second arms, said stepped portion cooperating with a second stop provided on an inner surface of said housing assembly side wall portion to prevent said drawer assembly from rearward movement beyond a preselected second position; and, said latch-receiving notch projecting rearwardly from a front edge of said horizontal portion of said drawer assembly drawer top.

6. The security vent of claim 5, further comprising:

a removable clip having a lower portion and an upper portion connected to the lower portion by an upright portion, said removable clip being removably secured to said upper portion of said drawer bottom, said removable clip upright portion cooperating with said second stop to prevent said drawer assembly from forward movement beyond said preselected first position.

7. The security vent of claim 1, further comprising:

a filter removably inserted into said filter-receiving slot of said drawer assembly.

8. The security vent of claim 5, further comprising:

a filter removably inserted into said filter-receiving slot of said drawer assembly.

9. The security vent of claim 8, further comprising:

a filter stop having a longitudinal cross-member being attached at either distal end thereof to opposing inner surfaces of said arms near said horizontal portion, said filter stop having at least one downward member depending downwardly from said cross-member, said at least one downward member being connected at a lower end thereof to said drawer bottom.

10. The security vent of claim 5, said draw assembly including:

a drawer face being attached along side edges thereof to front edges of said arms, said drawer face being attached along a lower edge thereof to a front edge of said drawer bottom lower portion, said drawer face having at least one orifice therethrough.

11. The security vent of claim 1, said latch assembly including:

a mount block mounted to an inner surface of said side wall portion, said mount block having a threaded hole therethrough;

a tightening screw being threadingly received by said mount block threaded hole, said tightening screw having a head portion opposing said key hole of said housing face;

a lock block fixedly attached to said tightening screw near a distal end thereof opposite the head portion;

a latch being fixedly attached to said tightening screw between said mount block and said lock block; and, wherein rotation of the tightening screw integrally rotates said latch and said lock block between said locked position and said unlocked position.

12. The security vent of claim 10, wherein:

said tightening screw head portion includes a recess having a plurality of side walls, said recess being sized to receive a key therein through said housing face key hole to move said latch assembly between said locked position and said unlocked position.

13. The security vent of claim 1, wherein:

said support is a wall.

14. The security vent of claim 1, wherein:

said drawer face is flush with said housing face when said drawer assembly is in said closed position.

15. The security vent of claim 1, wherein:

said first distal end of said housing assembly is attached to an inlet end of an air duct.

16. The security vent of claim 1, wherein:

said first distal end of said housing assembly is attached to an outlet end of an air duct.

17. The security vent of claim 7, wherein:

said filter is constructed from fiberglass.

18. The security vent of claim 8, wherein:

said filter is constructed from fiberglass.

*19. A vent, including:*

*a housing having four wall portions defining a passageway with two ends;*

*a filter receiving slot moveable from a first position at least partially within the passageway to a second position at least partially outside the passageway; and*

*a stop for limiting the travel of the filter receiving slot to approximately the thickness of the filter receiving slot.*

*20. A vent according to claim 19, further including a first face located adjacent to the filter receiving slot, the first face having openings for allowing air to flow through the first face.*

*21. A vent according to claim 20, wherein the filter receiving slot is located behind the face.*

*22. A vent according to claim 20, further including a housing face secured to the housing, and wherein the first face is moveable from a first position flush with the housing face to a second position at least partially spaced apart from the housing face.*

*23. A vent according to claim 19, further including a drawer moveable from a first position at least partially within the passageway to a second position at least partially outside of the passageway.*

*24. A vent according to claim 23 wherein the filter receiving slot is located in the drawer.*

*25. A vent according to claim 20, wherein the combined area of the openings is less than the remaining area of the face.*

*26. A vent according to claim 19, wherein the filter receiving slot includes an open top.*

*27. A vent according to claim 19, further including a filter located in the filter receiving slot.*

*28. A vent according to claim 20, further including a filter located directly behind the openings.*

*29. A vent according to claim 19, further including at least one rod located in the housing.*

*30. A vent according to claim 19, wherein the stop is secured to one of the wall portions.*

*31. A vent according to claim 19, wherein the stop is located at least partially within the passageway.*

*32. A vent according to claim 19, wherein the stop extends substantially the width of the passageway.*

*33. A vent according to claim 19, further including a shoulder and wherein the shoulder contacts the stop to limit travel of the filter receiving slot.*

*34. A vent according to claim 33, wherein the shoulder extends substantially the width of the passageway.*

*35. A vent according to claim 33, wherein the shoulder is located at least partially within the passageway.*

*36. A vent according to claim 19, further including a second stop for limiting movement of the filter receiving slot into the passageway.*

*37. A vent according to claim 30, wherein the second stop is located at least partially within the passageway.*

*38. A vent according to claim 36, wherein the second stop is secured to one of the wall portions.*

*39. A vent according to claim 36, wherein the second stop extends substantially the width of the passageway.*

*40. A vent according to claim 19, further including a latch assembly for securing the filter receiving slot against movement.*

*41. A vent according to claim 40, wherein the latch assembly includes a mount block.*

*42. A vent according to claim 41, wherein the mount block is secured to the housing.*

*43. A vent according to claim 40, wherein the latch assembly further includes a bolt.*

*44. A vent according to claim 20, further including a latch assembly located entirely behind the first face.*

*45. A vent according to claim 44, wherein the latch assembly includes a mount block.*

*46. A vent according to claim 45, wherein the mount block is secured to the housing.*

*47. A vent according to claim 44, wherein the latch assembly further includes a bolt.*

*48. An air handling apparatus including a vent according to any of claims 19 through 47, further including ductwork connected to the housing and a heating, ventilating and air conditioning system connected to the ductwork.*

*49. A security vent, comprising:*

*a housing assembly having a side wall with first and second distal ends thereof defining a passageway therethrough;*

*a drawer assembly having a filter-receiving slot, said drawer assembly being received by said housing assembly second distal end and being moveable between an open position and a closed position, wherein said filter-receiving slot is positioned within said housing assembly when said drawer assembly is in said closed position, and wherein said filter-receiving slot is in communication with a region outside said housing assembly when said drawer assembly is in said open position; and*

*a latch assembly mounted to said housing assembly, said latch assembly being moveable between a locked position and an unlocked position and being received by a latch-receiving notch in said drawer assembly when said drawer assembly is in said closed position and said latch assembly is in said locked position, thereby locking said drawer assembly in said closed position.*

*50. A security vent, comprising:*

*a housing assembly having a side wall with first and second distal ends thereof defining a passageway therethrough;*

*a drawer assembly having a filter-receiving slot, said drawer assembly being received by said housing assembly second distal end and being moveable between an open position and a closed position,*

*wherein said filter-receiving slot is positioned within said housing assembly when said drawer assembly is in said closed position, and wherein said filter-receiving slot is in communication with a region outside said housing assembly when said drawer assembly is in said open position;*

*a latch assembly being moveable between a locked position and an unlocked position, said latch assembly locking said drawer assembly in said closed position when said latch assembly is in said locked position;*

*a housing face attached to said second distal end of said side wall, said housing face having an opening therethrough sized to receive said drawer assembly, said opening communication with said passageway, said housing face projecting outwardly from said side wall, thereby defining a retaining ridge; and*

*a key hole extending through said housing face, said key hole being coaxial with said latch assembly.*

*51. A security vent, comprising:*

*a housing assembly having a side wall with first and second distal ends thereof defining a passageway therethrough;*

*a drawer assembly having a filter-receiving slot, said drawer assembly being received by said housing assembly second distal end and being moveable between an open position and a closed position, wherein said filter-receiving slot is positioned within said housing assembly when said drawer assembly is in said closed position, and wherein said filter-receiving slot is in communication with a region outside said housing assembly when said drawer assembly is in said open position;*

*a latch assembly being moveable between a locked position and an unlocked position, said latch assembly locking said drawer assembly in said closed position when said latch assembly is in said locked position; and*

*at least one longitudinal rod extending transversely across said passageway near said first distal end of said side wall, said at least one longitudinal rod being attached at either distal end thereof to an inner surface of said side wall portion.*

* * * * *